United States Patent [19]
Yamada et al.

[11] Patent Number: 5,477,114
[45] Date of Patent: Dec. 19, 1995

[54] METHOD AND SYSTEM FOR ESTIMATING INERTIA OF 2-MASS SYSTEM DURING SPEED CONTROL

[75] Inventors: Tetsuo Yamada; Yasuhiro Yoshida, both to Tokyo, Japan

[73] Assignee: Kabushiki Kaisha Meidensha, Tokyo, Japan

[21] Appl. No.: 159,488

[22] Filed: Nov. 30, 1993

[30] Foreign Application Priority Data

Nov. 30, 1992 [JP] Japan ................................ 4-320005
Feb. 1, 1993 [JP] Japan ................................ 5-014371

[51] Int. Cl.$^6$ ........................................ H02P 7/00
[52] U.S. Cl. .................... 318/457; 388/811; 318/648
[58] Field of Search ........................ 318/457, 568.16,
318/568.15, 568.11, 568.22, 568.23, 611,
609, 629–632, 798–812, 648, 99; 364/474.01,
474.11, 474.12, 474.15, 474.16, 474.19,
474.25, 474.3, 474.31, 474.35, 474.37;
73/461, 412, 862.13, 862.16, 862.24; 388/809–815,
930

[56] References Cited

U.S. PATENT DOCUMENTS

| 4,580,084 | 4/1986 | Takahashi et al. | 318/396 |
|---|---|---|---|
| 4,680,526 | 7/1987 | Okuyama et al. | 318/802 |
| 4,914,365 | 4/1990 | Murakami et al. | 318/609 |
| 4,969,545 | 11/1990 | Hayaski | 364/424.1 |
| 5,272,423 | 12/1993 | Kim | 318/560 |
| 5,304,906 | 4/1994 | Arita et al. | 318/568.16 |
| 5,325,460 | 6/1994 | Yamada et al. | 388/811 |
| 5,505,940 | 9/1991 | Bedford et al. | 364/426.02 |

FOREIGN PATENT DOCUMENTS

| 0476588 | 3/1992 | European Pat. Off. |
| WO89/07209 | 8/1989 | WIPO |

OTHER PUBLICATIONS

C. Ohsawa et al., "Parameter Identification of 2-Mass System and Suppression of Torsional Vibration", International Power Electronics Conference, Apr. 1990, pp. 428–435.

*Primary Examiner*—Jonathan Wysocki
*Attorney, Agent, or Firm*—Foley & Lardner

[57] ABSTRACT

A method and system for estimating an inertia of 2-mass system constituted by a motor and a load connected through a torsionable shaft during operation. The estimating method is implemented as follows: (a) obtaining a deviation between a motor speed preset value and a motor speed in a deviation section; (b) inputting the deviation from the deviation section into an adding section through a speed control amplifier; (c) obtaining a motor generating torque by inputting the output from the speed control amplifier and the load torque estimate into an adding section; (e) inputting the motor generating torque into a model of the 2-mass system; and (f) obtaining an inertia error by inputting the load torque estimate into the inertia error estimating section. With this method, it becomes possible to estimate the inertia of the 2-mass system even if the load inertia is varied during operation.

6 Claims, 11 Drawing Sheets

METHOD AND SYSTEM FOR ESTIMATING INERTIA OF 2-MASS SYSTEM DURING SPEED CONTROL

BACKGROUND OF THE INVENTION

1. Field of the Invention

The present invention relates to a method and system for estimating an inertia of torsionally vibrating 2-mass system in a speed control.

2. Description of the Prior Art

It is well known that if 2-mass system is constituted by a motor and a load connected through a low rigidity shaft (elastic shaft) in an elevator, rolling mill of steel or arm of robot, the 2-mass system generates a shaft torsional vibration and cannot be improved in responsibility of a speed control system. Further, such a shaft torsional vibration is effected by a ratio between inertia of moments of the motor and the load. In particular, the vibration tends to be generated when the moment of inertia of the load is smaller than that of the motor. Although a conventional method, which uses a load torque estimating observer, has been proposed for the control of the 2-mass system, the method is not very effective for suppressing the shaft torsional vibration when the moment of inertia of the load is smaller than that of the motor.

Furthermore, in order to effectively suppress the torsional vibration of the 2-mass system, a method for estimating inertia of the 2-mass system has been proposed. In this method, first, an inertia of 1-mass system (a motor) is estimated by a speed-accelerating test of a motor. Then, after the connection of a load with the motor, the 2-mass system is gradually accelerated so as not to generate a vibration, and under this condition an inertia of the 2-mass (motor+load) system is estimated.

However, such a conventional estimating method is not useful in a system which is applied to a condition that a load inertia is deviated during operation, such as, to a robot arm or an elevator since the conventional estimating method cannot implement the estimation of the 2-mass system which generates a torsional vibration during operation.

SUMMARY OF THE INVENTION

It is an object of the present invention to provide an inertia estimating method and system which enable the estimation of inertia of torsionally vibrating 2-mass system even if it is applied to a condition that a load inertia is deviated during operation.

An aspect of the present invention resides in a method of estimating an inertia of 2-mass system in a speed control system for controlling the 2-mass system of a motor and a load connected through an elastic shaft. The speed control system comprises a speed control amplifier which amplifies a deviation between a preset speed and a motor speed, a load torque estimate observer which obtains a load torque estimate, and a model machine control system which outputs a load torque command upon receiving the sum of the output of the speed control amplifier and the load torque estimate. Further, the speed control system controls the 2-mass system according to the torque command. In the speed control system, the method comprises the following steps: (a) obtaining an observer speed estimate from an integral factor which has a model machine time constant of the sum of a machine time constant of the motor and a machine time constant of the load, by inputting a deviation between the load torque estimate and a load torque equivalent value into the integral factor; and (b) estimating the inertia of the 2-mass system by dividing the observer speed estimate by the motor speed.

Another aspect of the present invention resides in a system for estimating an inertia of 2-mass system in a speed control system for controlling the 2-mass system of a motor and a load connected through an elastic shaft. The speed control system comprises a speed control amplifier which amplifies a deviation between a preset speed and a motor speed, a load torque estimate observer which obtains a load torque estimate, and a model machine control system which outputs a load torque command upon receiving the sum of the output of the speed control amplifier and the load torque estimate, the speed control system controlling the 2-mass system according to the torque command, said system comprising: means for outputting an observer speed estimate from a first integral factor which has a model machine time constant of the sum of a machine time constant of a motor and a machine time constant of a load in such a manner to input a deviation between the load torque estimate and the load torque equivalent value into the integral factor; and means for estimating the inertia of the 2-mass system in such a manner to divide the output from the integral factor by the motor speed.

BRIEF DESCRIPTION OF THE DRAWINGS

In the drawings, like reference numerals designate like parts and like elements throughout all figures, in which.

DETAILED DESCRIPTION OF THE INVENTION

Reference will hereinafter be made to drawings in order to facilitate a better understanding of the present invention.

First, it will be discussed that a method of estimating inertia of 1-mass system by using a load torque observer is applicable to 2-mass system.

Figure 14:
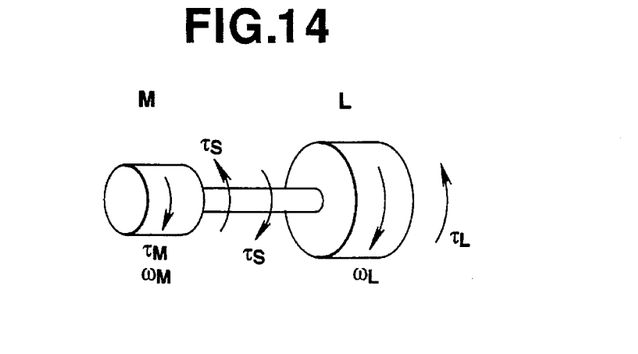
FIG. 14 is an explanatory view of a model of a 2-mass system.

Hereinafter, a principle of the inertia error estimation in 2-mass system will be discussed. FIG. 14 shows an explanatory view which shows a model of 2-mass system. The 2-mass system comprises a motor M and a load L which are connected through an elastic shaft S. In FIG. 14, $\tau_M$ is a motor generating torque, $\omega_M$ is a motor angle speed, $\tau_L$ is a load torque, $\omega_L$ is an angle speed of load L, and $\tau_S$ is a shaft torque.

On the basis of the model of 2-mass system shown in FIG. 14, the equations of motion thereof are obtained as follows:

$$n_M = (\tau_M - \tau_S)/T_M S \quad (1)$$

$$n_L = (\tau_S - \tau_L)/T_L S \quad (2)$$

$$\tau_S = (n_M - n_L)/T_S S \quad (3)$$

where $n_M$ is a motor speed, and $n_L$ is a load speed.

Figure 15:
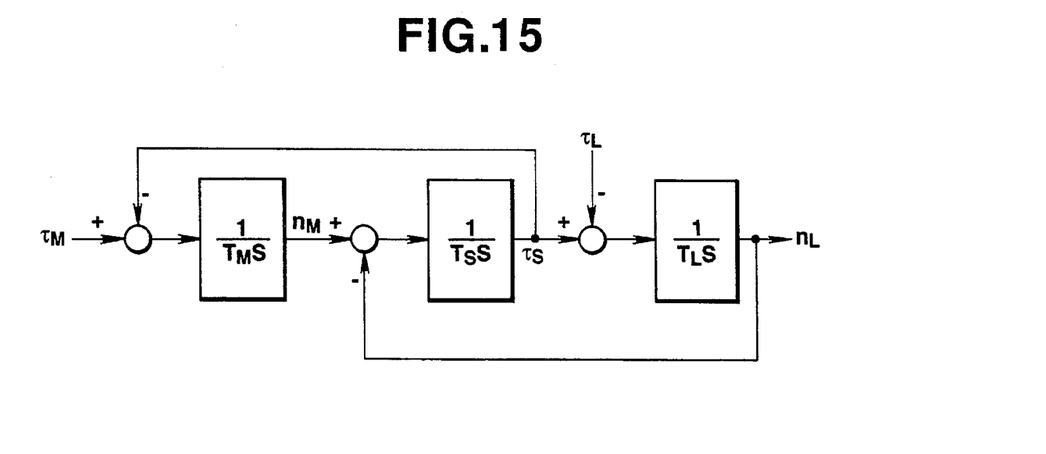
FIG. 15 is a block diagram of the 2-mass system of FIGS. 13A and 13B.

FIG. 15 shows a block diagram of the 2-mass system of FIG. 14. In FIG. 15, $T_M$ denotes a time constant of a machine of motor, $T_L$ denotes a machine time constant of load, and $T_S$ denotes a time constant of a spring.

When the above-mentioned 2-mass system having a motor and a load inertia is approximated by 1-mass system, a load torque estimate $\hat{\tau}_L$, which is estimated by a load torque estimating observer, is represented by the following equation (4):

$$\hat{\tau}_L = (\tau_M - T_{ML}^* S n_M)/(1 + ST_X^*) \quad (4)$$

wherein $T_{ML}^*$ is a model machine time constant of $(T_M + T_L)$, $T_X^* = T_{ML}^*/L_1$, and $L_1$ is an observer gain.

By using the equations (1) and (2), the motor generating torque $\tau_M$ is represented by the following equation (5):

$$\tau_M = \tau_L + ST_M n_M + SL_L n_L \quad (5)$$

By substitute the equation (5) for the equation (4), the following equation (6) is obtained.

$$\hat{\tau}_L = \frac{1}{1 + ST_X^*} \{\tau_L + S(T_M - T_{ML}^*)n_M + ST_L n_L\} \quad (6)$$

$$= \frac{1}{1 + ST_X^*} \{\tau_L + S(T_M + T_L - T_{ML}^*)n_m + ST_L(n_L - n_M)\}$$

When an inertia sum-ratio of the real machine and the model is $K = (T_M + T_L)/(T_M^* + T_L^*) = (T_M + T_L)/T_{ML}^*$, the equation (6) is deformed as follows:

$$\hat{\tau}_L = \frac{1}{1 + ST_X^*} \{\tau_L + S(K-1)T_{ML}^* \times n_M + ST_L(n_L - n_M)\} \quad (7)$$

In case that $n_M$=constant in the equation (7), since it is assumed that the system has no-vibration and keeps stable, the motor speed $n_M$ equals to the load speed $n_L$ ($n_M = n_L$). In this stationary state, the load torque estimate $\hat{\tau}_L$ becomes equal to the load torque $\tau_L$ ($\hat{\tau}_L = \tau_L$). That is to say, when the 2-mass system is approximated to the 1-mass system and when the load torque $\tau_L$ is estimated by using the load torque observer, such equal condition $\hat{\tau}_L = \tau_L$ is obtained under the stationary state. Accordingly, by keeping the load torque estimate $\hat{\tau}_L$ which is in a stable state under non-acceleration condition as is similar to in the 1-mass system, it becomes possible to almost accurately estimate the load torque $\tau_L$.

In the equation (7), when it is assumed that the load torque is not varied during the inertia estimation (during the acceleration operation) while holding data during a stable condition which data is obtained by the load torque estimate $\hat{\tau}_L$ as a load torque equivalent value $\tau_L'$, it may be treated that $\tau_L = \tau_L'$.

Accordingly, it becomes possible to neglect the first delay factor applied to the load torque $\tau_L$ of the equation (7). With these assumptions, the equation (7) is deformed as follows:

$$\hat{\tau}_L - \tau_L = \frac{1}{1 + ST_X^*} \{S(K-1)T_{ML}^* \times n_M + ST_L(n_L - n_M)\} \quad (8)$$

$$(1 + ST_X^*)(\hat{\tau}_L - \tau_L) = S(K-1)T_{ML}^* \cdot n_M + ST_L(n_L - n_M)$$

$$K - 1 = \left\{ \frac{1}{ST_X^*}(\hat{\tau}_L - \tau_L) + \frac{1}{L_1}(\hat{\tau}_L - \tau_L) \right\} \frac{1}{n_M} +$$

$$\frac{T_L}{T_{ML}^*} \cdot \frac{n_M - n_L}{n_M}$$

When it is possible to reduce the torsional vibration by means of a correction of the observer, the motor speed $n_M$ equals to the load speed $n_L$ ($n_M = n_L$) under a stationary state. That is to say, under a stationary state, the third term of the right side in the equation (8) has no effect to the inertia error $K - 1$. Therefore, an inertia error estimating circuit applied to the 1-mass system may be applied to the 2-mass system. Accordingly, the equation (8) may be approximated by the after-mentioned equation (9).

Figure 1:
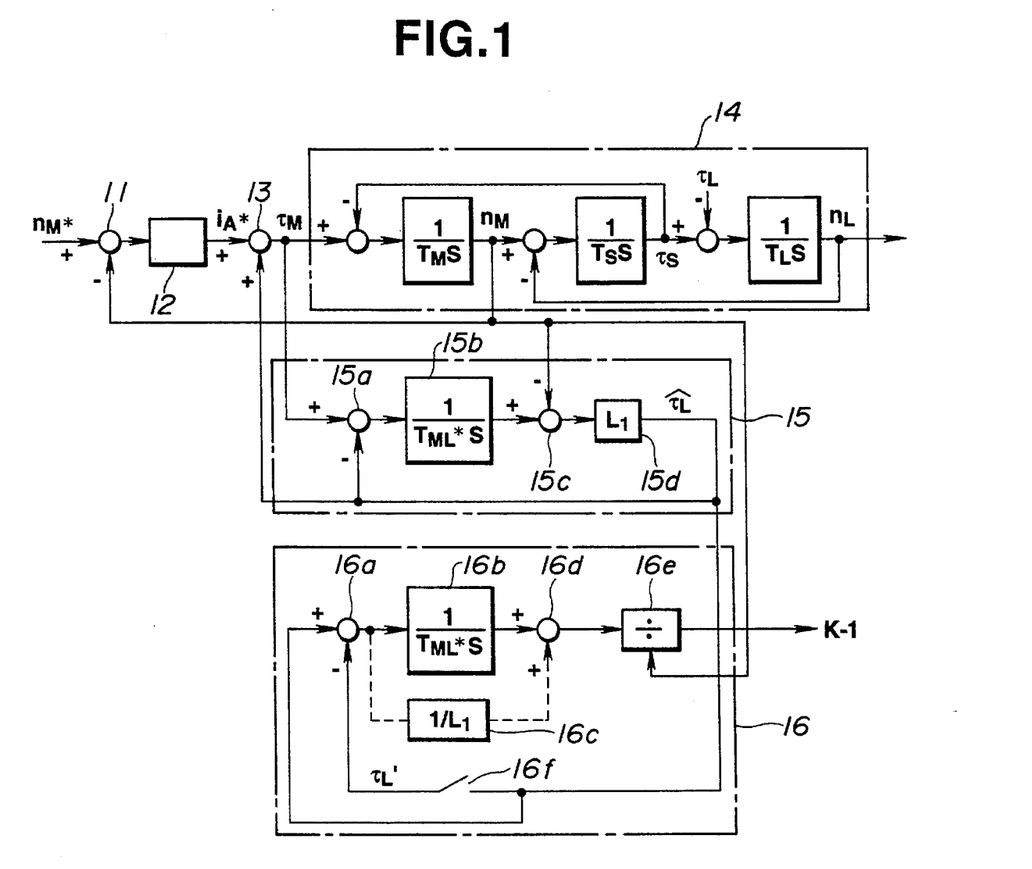
FIG. 1 is a block diagram showing a first embodiment of an inertia estimating circuit of a speed controller in 2-mass torsional vibration system.

FIG. 1 shows a first embodiment of the inertia estimating circuit of the torsionally vibrating 2-mass system according to the present invention.

In FIG. 1, reference numeral 11 is a deviation section which obtains the deviation between the motor speed command $n_M^*$ and the motor speed $n_M$. The output of the deviation section 11 is inputted into a speed control amplifier 12. The output $i_A^*$ of the speed control amplifier 12 is inputted into the adding section 13 wherein the output $i_A^*$ of the speed control amplifier 12 is added with the load torque estimate $\hat{\tau}_L$. The output of the adding section 13 is treated as a motor generating torque $\tau_M$ and is supplied to a 2-mass system model 14 shown in FIG. 15. The motor generating torque $\tau_M$ is inputted into the load torque estimating observer 15 wherein the load torque estimate $\hat{\tau}_L$ is obtained.

The load torque estimating observer 15 comprises a deviation section 15a which detects a deviation between the motor generating torque $\tau_M$ and the load torque estimate $\hat{\tau}_L$. The output of the deviation section 15a is supplied to an integration section 15b which is constituted by a time constant of the model machine. A deviation section 15c obtains a deviation between the output of the integration section 15b and the motor speed $n_M$. The output of the deviation section 15c is supplied to an observer gain section 15d where the load torque estimate $\hat{\tau}_L$ outputted.

The load torque estimate $\hat{\tau}_L$ from the load torque estimating observer 15 is supplied to the inertia error estimating section 16. The inertia error estimating section 16 comprises a deviation section 16a to which the load torque estimate $\hat{\tau}_L$ and the load torque equivalent value $\tau_L'$ are supplied. The output of the deviation section 16a is supplied to an integration section 16b constituted by a model machine time constant and an inverse-number section 16c for the observer gain. Both outputs of the integral factor 16b and the inverse-number section 16d are inputted into an adding section 16d. The output of the adding section 16d is divided by the motor speed $n_M$ in a dividing section 16e. A switch section 16f for obtaining the load torque equivalent value $\tau_L'$ is installed in the inertia error estimating section 16.

Assuming that the load torque is kept constant, the load torque estimate $\hat{\tau}_L$ becomes equal to the load torque equivalent value $\tau_L'$ $(\hat{\tau}_L = \tau_L)$ under a stationary state. Accordingly, the second term of the right side of the equation (9) is negligible.

Figure 2:
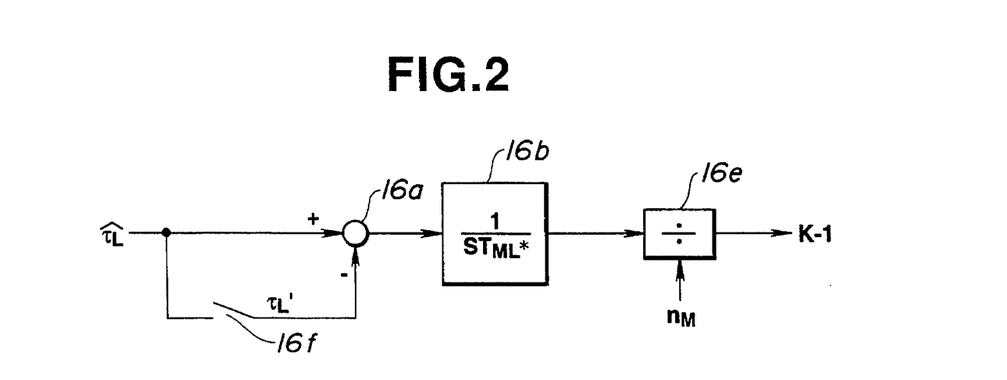
FIG. 2 is a block diagram which shows a second embodiment of the inertia estimating circuit.

FIG. 2 shows a second embodiment of the inertia torque estimating circuit according to the present invention. In the second embodiment, the observer gain inverse-number section 16c of the inertia error estimating section 16 be omitted as shown in FIG. 2.

$$K - 1 = \left\{ \frac{1}{ST_{ML}^*} (\hat{\tau}_L - \tau_L) + \frac{1}{L_1} (\mu\tau_L - \tau_L) \right\} \frac{1}{n_M} \quad (9)$$

Figure 3:
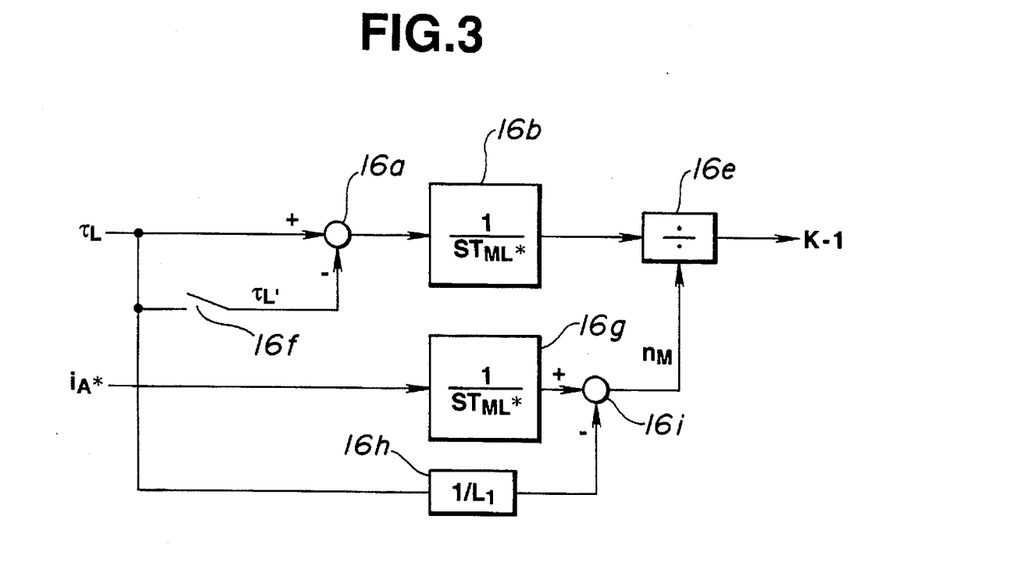
FIG. 3 is a block diagram which shows a third embodiment of the inertia estimating circuit.

Referring to FIG. 3, there is shown a third embodiment of the inertia estimating circuit according to the present invention.

The third embodiment is a deformation of the second embodiment. That is, the third embodiment further comprises a second integral factor 16g which is constituted by a model machine time constant of the sum of the machine time constants of the motor and the load. An observer-gain inverse-number section 16h and a deviation section 16i are further added to the inertia error estimating section 16. The second integration section receives the output $i_A^*$ of the speed control amplifier 12.

Figure 4:
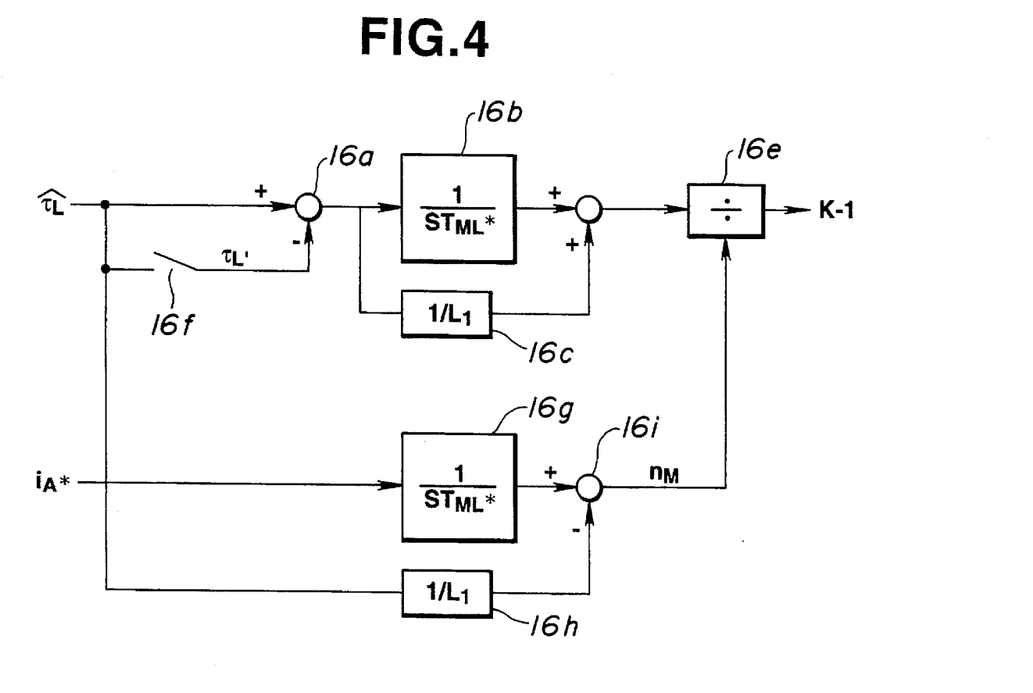
FIG. 4 is a block diagram which shows a fourth embodiment of the inertia estimating circuit.

Referring to FIG. 4, there is shown a fourth embodiment of the inertia estimating circuit according to the present invention.

The fourth embodiment comprises a second integration factor 16g, an observer gain inverse number section 16h and a deviation section 16i in the inertia error estimating section 16 of the third embodiment.

Figure 5:
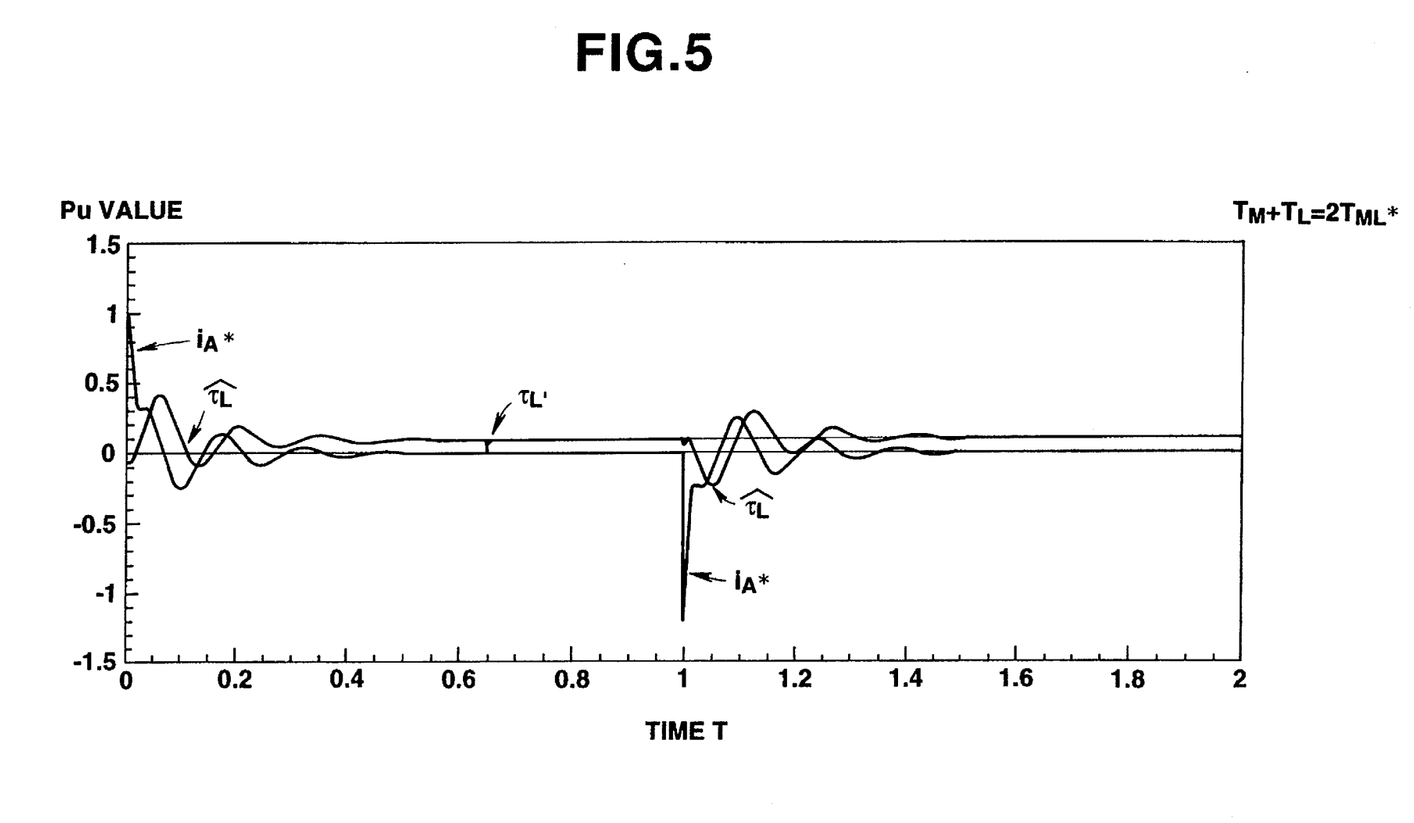
FIG. 5 and 6 show characteristic views which show examples of a simulation of the estimation of the inertia error of the 2-mass torsional vibration system.
Figure 6:
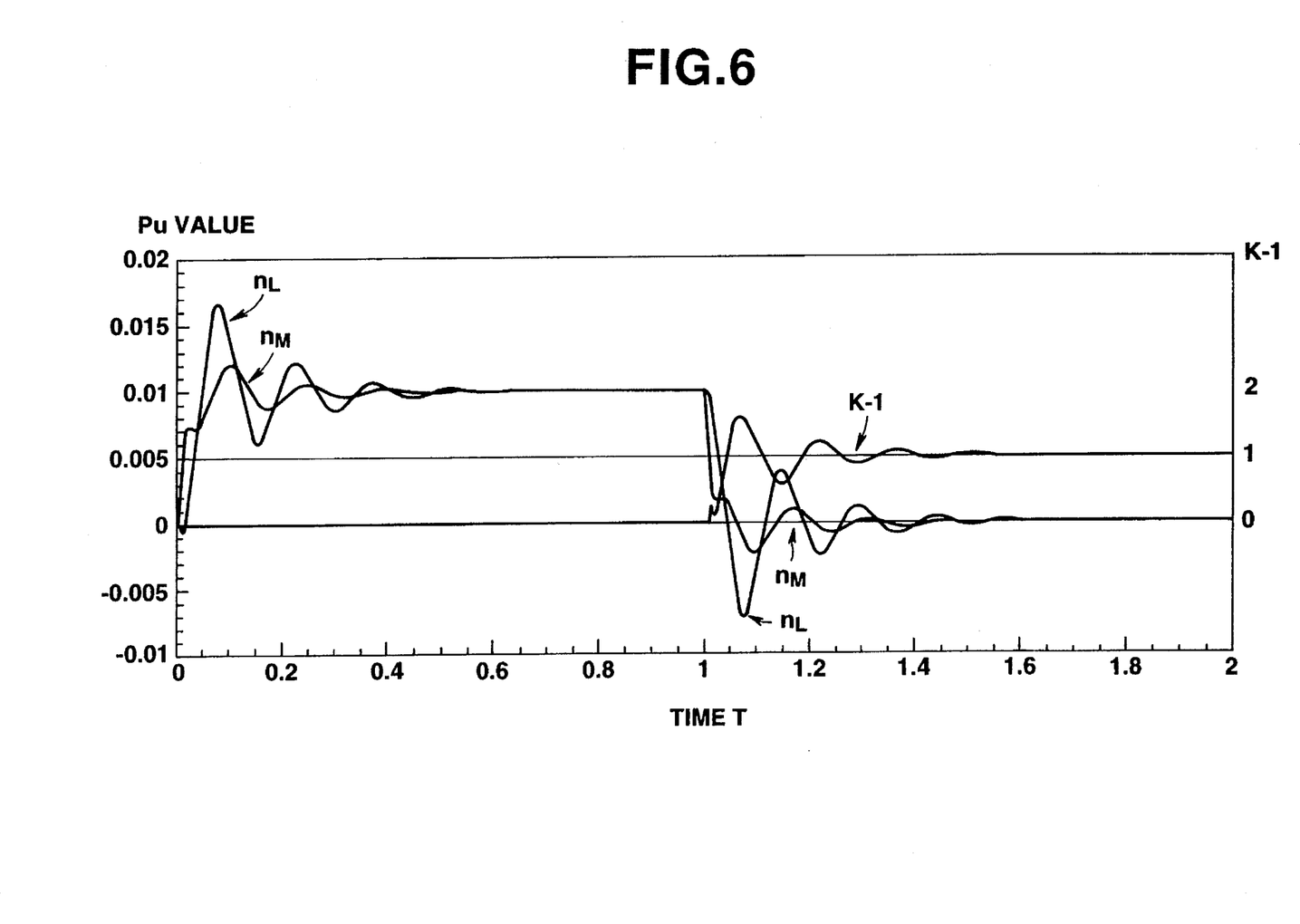

FIGS. 5 and 6 are characteristic graphs which show examples of simulation of the inertia error estimation of the torsionally vibrating 2-mass system. FIG. 5 shows the characteristic curves of $i_A^*$, $\hat{\tau}_L$, and $\tau_L'$ when $T_M + T_L = 2 \cdot T_{ML}^*$. FIG. 6 shows the characteristic curves of $n_M$, $n_L$, and K-1 when $T_M + T_L = 2 \cdot T_{ML}^*$.

Figure 7:
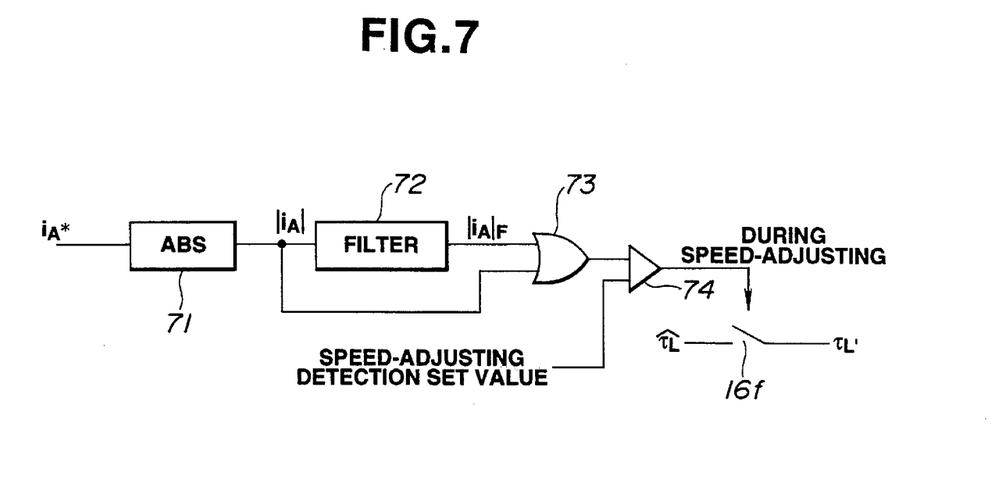
FIG. 7 is a block diagram which shows a detector circuit for detecting a speed-adjusting condition.

FIG. 7 shows a detector circuit which is used to judge that the system in the speed-adjusting condition (accelerating or decelerating condition) when the output $i_A^*$ of the speed control amplifier 12 is greater than a predetermined value. The detector circuit comprises an absolute value circuit 71 and a filter 72 for taking an overshoot and an undershoot of the output $i_A^*$ into consideration.

The output $|i_A|$ of the absolute circuit and the output $|i_A|F$ of the filter 71 are transferred through an OR circuit 73 to a comparator 74 wherein the outputs are compared with a speed-adjusting detection set value. When the output from the OR circuit 73 is larger than the speed-adjusting detection set value, a signal indicative that the 2-mass system is now in a speed-adjusting condition (accelerating or decelerating condition) is outputted from the comparator 74, and in reply to the signal a switch 16f is opened. Accordingly, the load torque estimate is held and therefore the lead torque equivalent value $\tau_L'$, which keeps stable, is obtained.

The above-mentioned embodiment is an inertia error (K-1) estimating section.

A principle of the estimation of an inertia ratio of the 2-mass system will be discussed hereinafter.

First, a method for directly estimating an inertia ratio K which is studied in the 1-mass system will be explained.

By combining the equations (1) and (2), the following equation (10) is obtained.

$$\begin{aligned}\tau_M - \tau_L &= ST_M n_M + SL_1 n_L \\ &= S(T_M + T_L) n_M + SL_L(n_L - n_M)\end{aligned} \quad (10)$$

From the equation (10), the following equation (11) is obtained.

$$n_M = \frac{1}{S(T_M + T_L)} (\tau_M - \tau_L) + \frac{T_L}{T_M + T_L} (n_M - n_L) \quad (11)$$

Assuming that the condition of the system is finally converged into a stable no-vibration condition even if a vibration is occurred during the speed-adjusting period, $n_M = n_L$ is kept in a stationary state. Furthermore, since the second term of a right side of the equation (11) becomes zero under a stationary state, the motor speed $n_M$ is approximated by the first term of the right side of the equation (11) as follows:

$$n_M = \frac{1}{S(T_M + T_L)} (\tau_M - \tau_L) \quad (12)$$

By approximating the motor+load inertia of the 2-mass system to the 1-mass system, the motor speed estimate $\hat{n}_m$ is obtained by the following equation (13):

$$\begin{aligned}\hat{n}_M &= \frac{1}{S(T_M^* + T_L^*)} (\tau_M - \tau_L) \\ &= \frac{1}{ST_{ML}^*} (\tau_M - \tau_L)\end{aligned} \quad (13)$$

In this situation, when stable data of the load torque estimate $\hat{\tau}_L$, which is obtained by the lead torque estimate observer as is similar to the fourth embodiment, is approximated to the load torque $\tau_L$, the load torque $\tau_L$ in the equations (11) and (12) can be treated as the load torque equivalent value $\tau_L'$. Accordingly, the inertia ratio $K = (T_M + T_L)/T_{ML}^*$ is obtained by using the equations (12) and (13) as follows:

$$K = \hat{n}_m / n_M \quad (14)$$

This is the same result as that of the 1-mass system.

Figure 8:
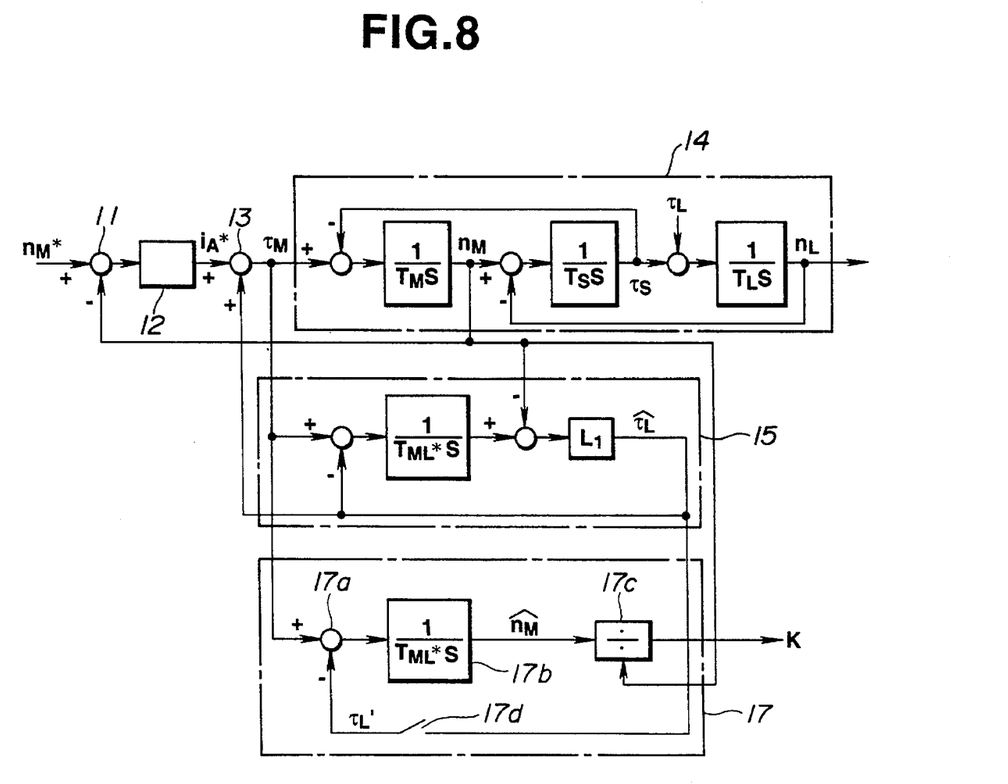
FIG. 8 is a block diagram which shows a fifth embodiment of the inertia estimating circuit.

FIG. 8 shows a fifth embodiment of the inertia estimating circuit according to the present invention.

Figure 9:
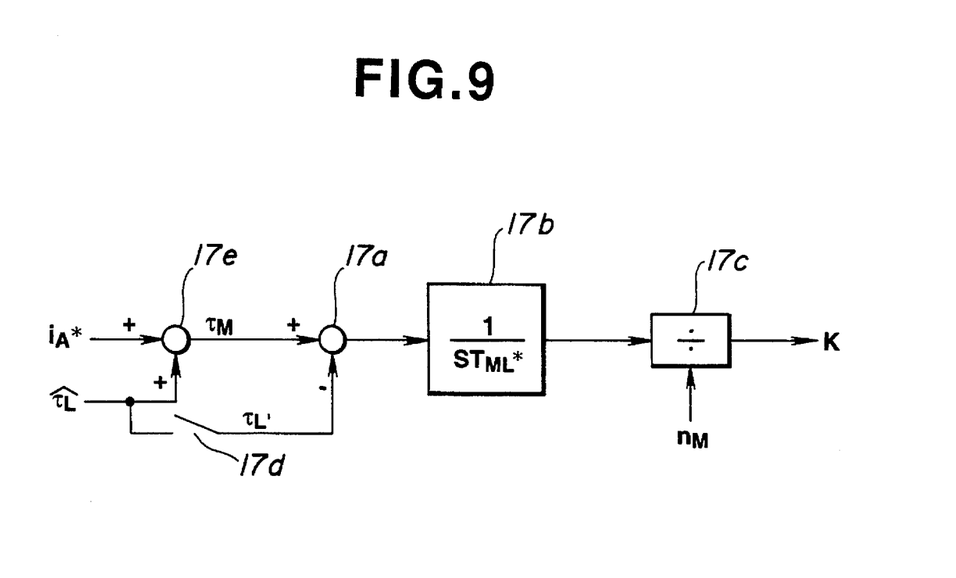
FIG. 9 is a block diagram which shows a sixth embodiment of the inertia estimating circuit.

According to the above-obtained result, an estimating section of the inertia ratio K of the 2-mass system is described as shown the fifth embodiment. As shown in FIG. 8, an inertia ratio estimating section 17 comprises a deviation section 17a, an integral factor 17b, a dividing section 17c and a switch 17d. The deviation section 17a outputs a deviation between the motor generating torque $T_M$ and the load torque equivalent value $\tau_L'$. The integral factor 17b is constituted by a model machine time constant (the sum of the machine time constant of the motor and the machine time constant of the load) and outputs the motor speed estimate $\hat{n}_m$ according to the output of the deviation section 17a. The dividing section 17c divides the motor speed estimate $\hat{n}_m$ by the motor speed $n_M$ and outputs the inertia ratio K FIG. 9 shows a sixth embodiment of the inertia estimating system according to the present invention.

The sixth embodiment is different from the fifth embodiment in the inertia ratio estimating section 17. The inertia ratio estimating section 17 of the sixth embodiment comprises an adding section 17e. The output $i_A^*$ of the speed control amplifier 12 is applied to an input end of the adding section 17e. The load torque estimate $\hat{\tau}_L$ is applied to the other input end of the adding section 17e. The adding section 17e outputs the motor generating torque $\tau_M$ to the deviation section 17a.

Figure 10:
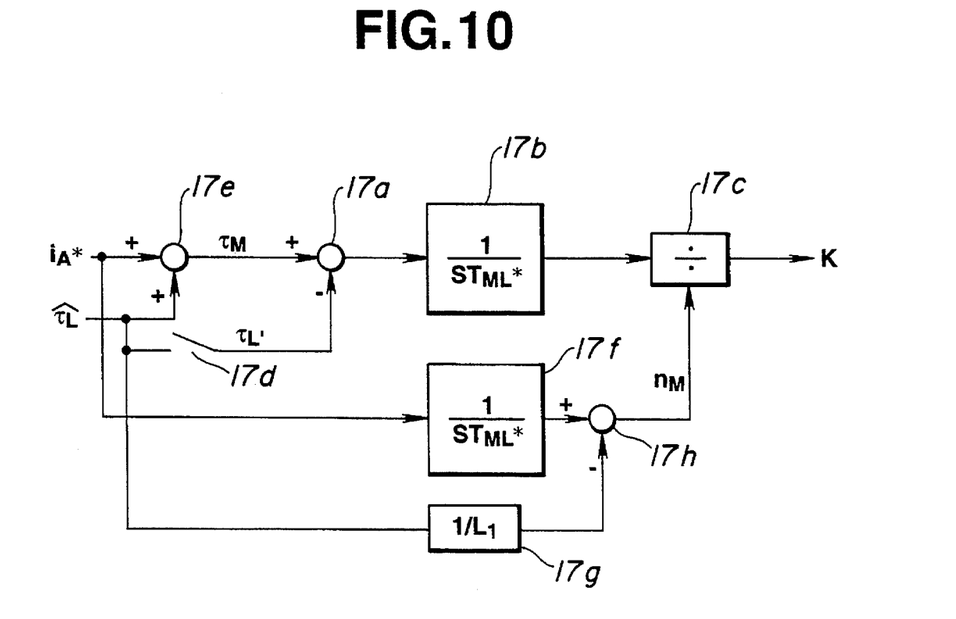
FIG. 10 is a block diagram which shows a seventh embodiment of the inertia estimating circuit.

FIG. 10 shows a seventh embodiment which is arranged such that a second integral factor 17f, an observer gain inverse number section 17g and a deviation section 17h are further added in the inertia ratio estimating section of the sixth embodiment. The second integral factor 17f receives the output $i_A^*$ of the speed control amplifier 12, and the observer gain inverse number section 17g receives the load torque estimate $\hat{\tau}_L$. The outputs of the second integral factor 17f and the observer gain inverse number section 17g is inputted into the deviation section 17h which outputs the motor speed $n_M$.

Figure 11:
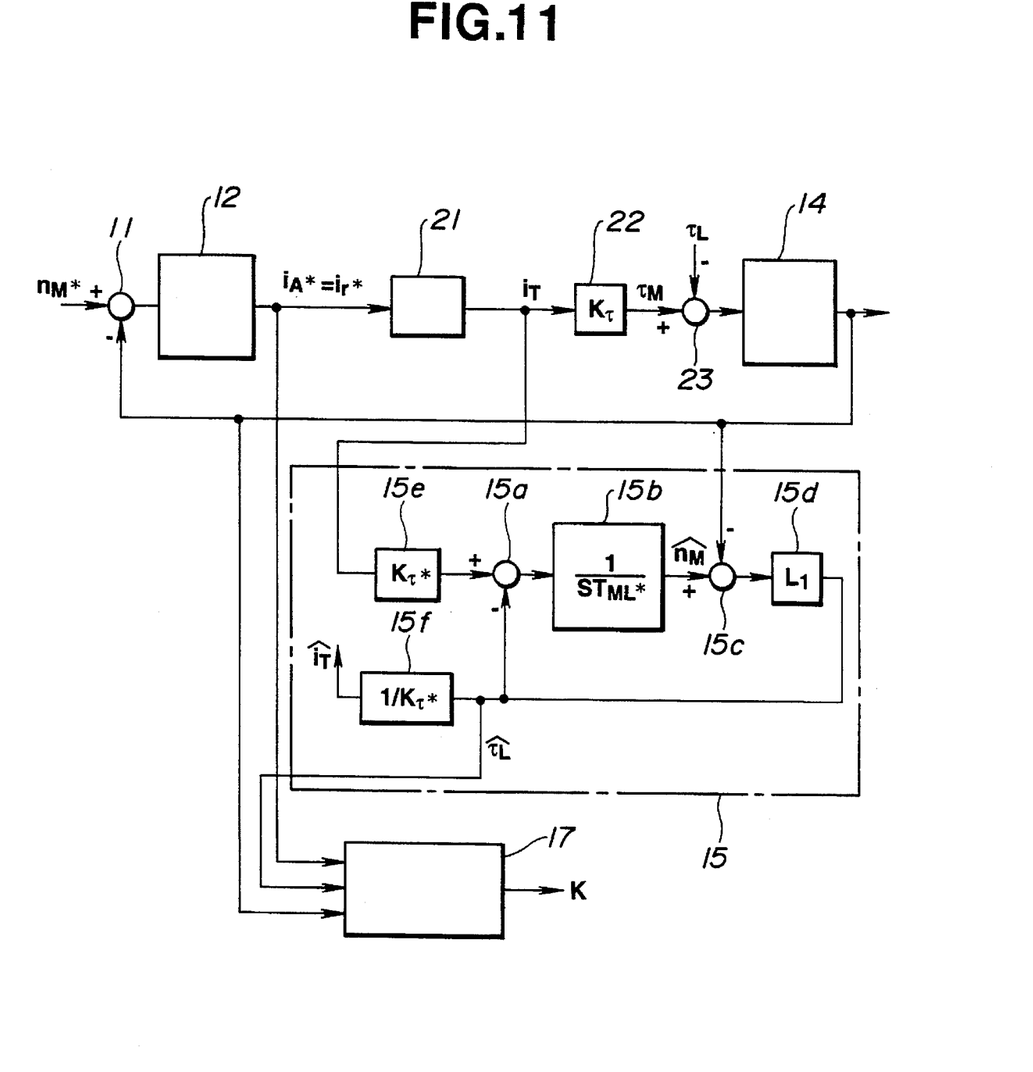
FIG. 11 is a block diagram which shows an eighth embodiment of the inertia estimating circuit.
Figure 12:
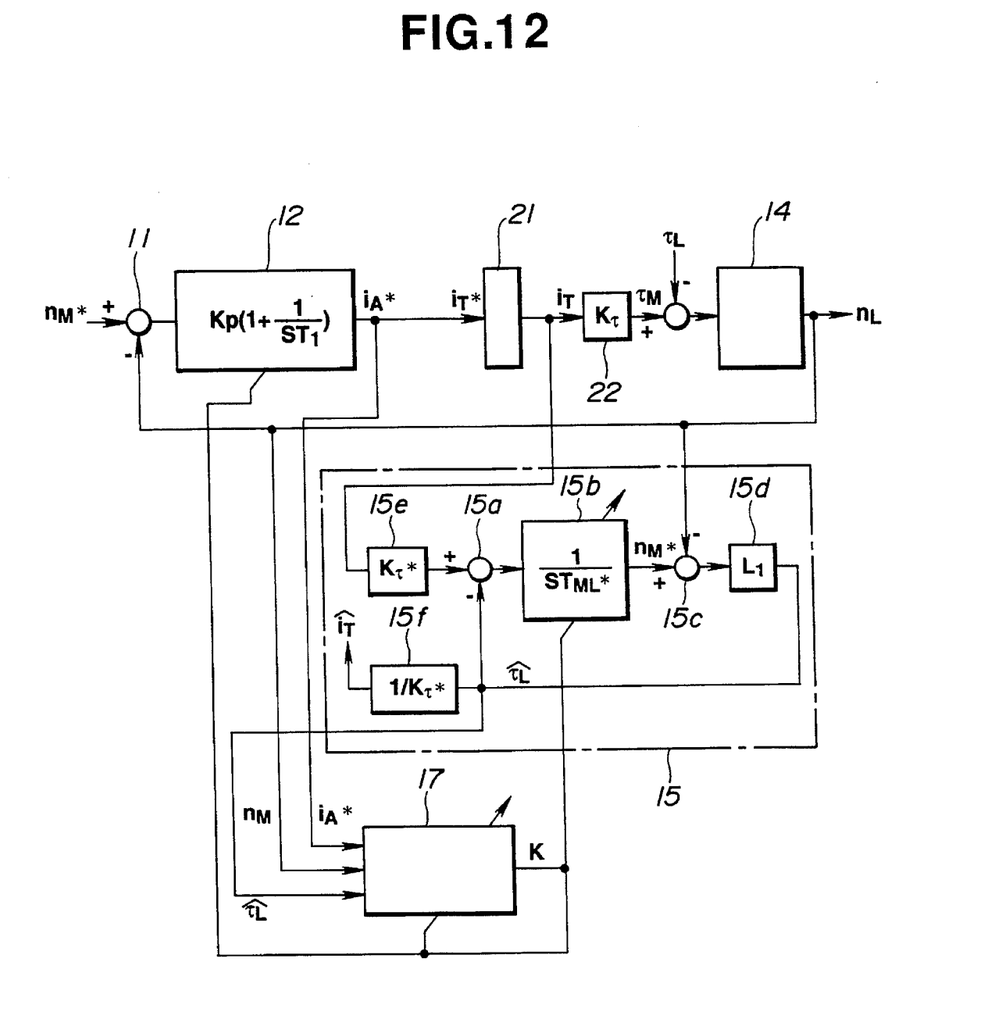
FIG. 12 is a block diagram which shows a ninth embodiment of the inertia estimating circuit.

Although the above-mentioned embodiments have been arranged such that the torque current command $i_T^*$ is outputted by adding the load torque estimate $\hat{\tau}_L$ from the observer gain inverse section 17g and the output $i_A^*$ of the speed control amplifier 12, eighth and ninth embodiments are arranged to have an inertia ratio estimating section where the load torque estimate $\hat{\tau}_L$ is not added to the torque current command $i_T^*$.

FIG. 11 shows the eighth embodiment of the inertia estimating circuit according to the present invention.

As shown in FIG. 11, a current control system 21 receives the output $i_A^*$ of the speed control amplifier 12 and outputs a torque current $i_T$. The torque current is inputted to a constant section 22 of a torque coefficient K$\tau$, and the torque command $\tau_M$ is outputted from the constant section 22. A deviation section 23 receives the torque command $\tau_M$ and the load torque $\tau_L$, and outputs the deviation to a 2-mass system model 14. In the load torque estimating observer 15, reference numeral 15e is a constant section of the model value K$\tau^*$ of the torque coefficient, and 15f is an inverse number section of the model value K$\tau^*$.

FIG. 12 shows the ninth embodiment of the inertia estimating circuit according to the present invention. In this embodiment, auto-tuning of the motor speed control system is implemented by applying the variation K of the inertia ratio estimating section 17 to the model machine time constant 15b of the load torque estimating observer 15 and the speed control amplifier 12.

Figures 13A, 13B:
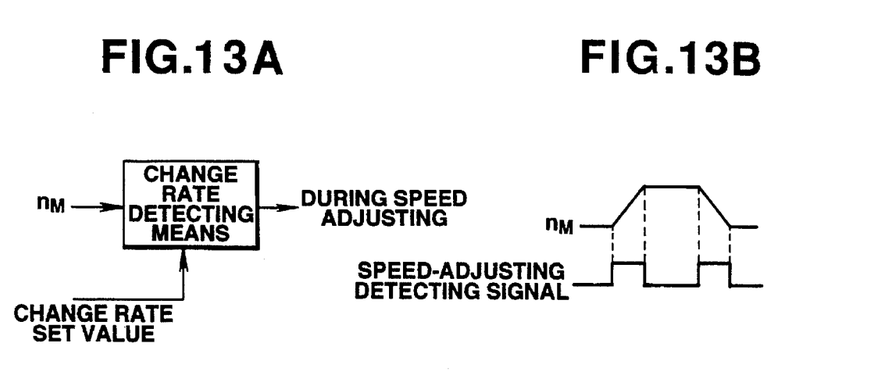
FIG. 13A is a block diagram of a detector circuit for detecting a variation ratio.
FIG. 13B is a wave form view.

In FIGS. 11 and 12, since the load torque estimate $\hat{\tau}_L$ is not added to the output $i_A^*$ of the speed control amplifier 12, a speed-adjusting period detecting circuit as shown in FIG. 13A is used. When the change of the motor speed $n_M$ is larger than a variation preset value in FIG. 13A, a signal indicative that the speed-adjusting is now implemented is outputted as shown in FIG. 13B.

Figure 16:
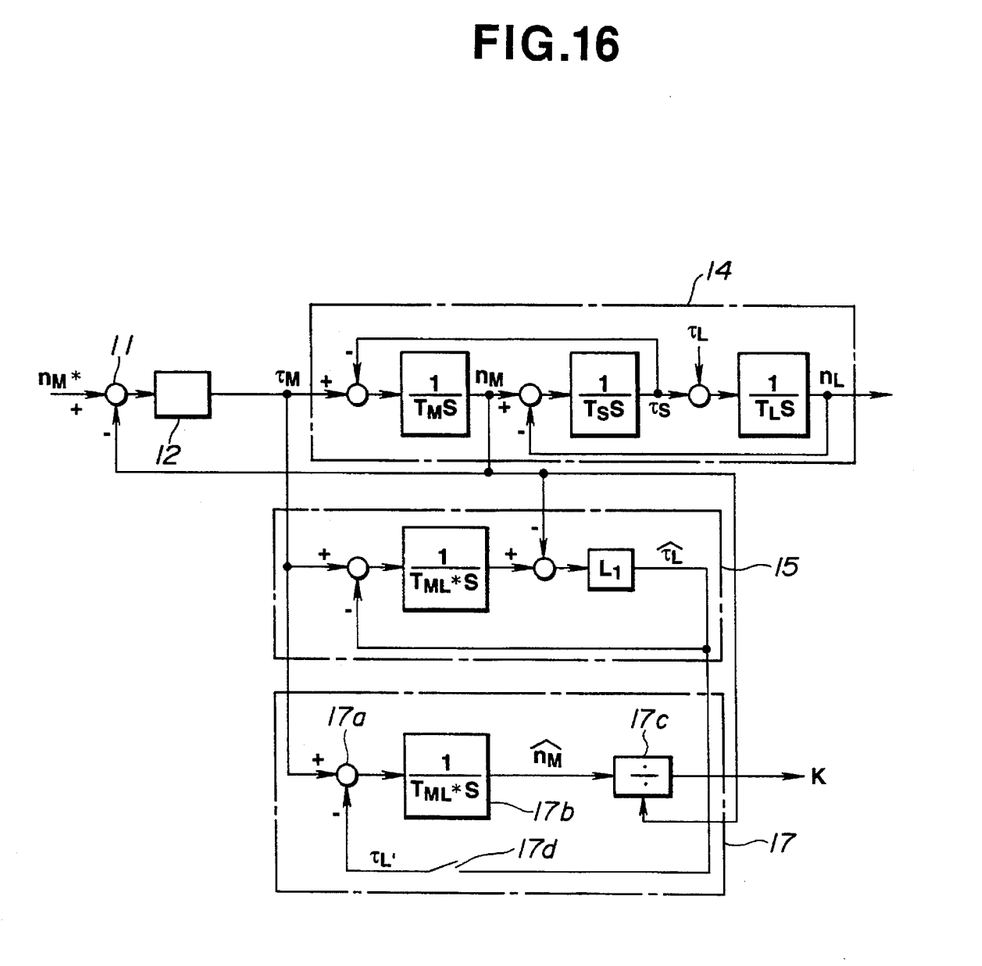
FIG. 16 is a block diagram of a tenth embodiment of the inertia estimating circuit.
Figure 17:
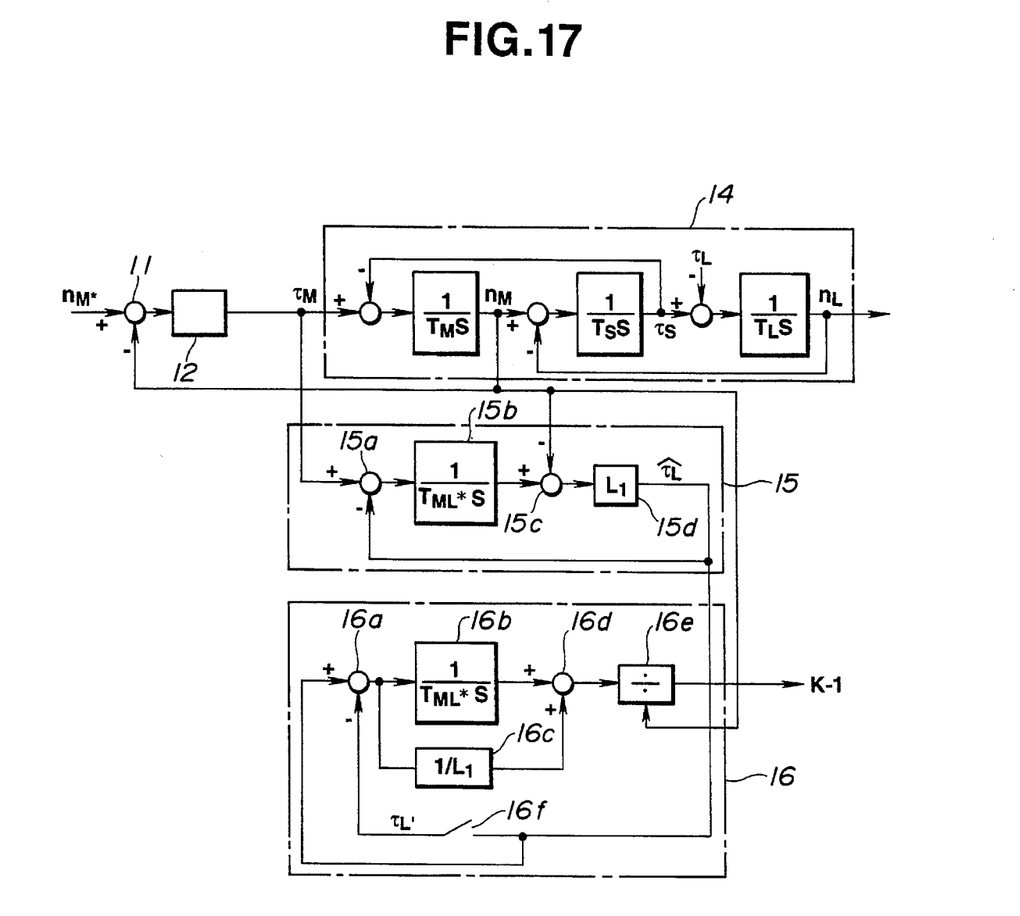
FIG. 17 is a block diagram of an eleventh embodiment of the inertia estimating circuit.

Both of tenth and eleventh embodiments of the inertia estimating circuit comprise an inertia estimating section where the load torque estimate $\hat{\tau}_L$ is not added to the torque current command $i_T^*$ as is similar to the eighth and ninth embodiments.

FIG. 16 shows the tenth embodiment wherein it is arranged such that the load torque estimate $\hat{\tau}_L$ is not added to the output of the speed control amplifier 12 of the fifth embodiment of FIG. 8.

FIG. 17 shows the eleventh embodiment wherein it is arranged such that the load torque estimate $\hat{\tau}_L$ is not added to the output of the speed control amplifier 12 of the first embodiment of FIG. 1. It will be understood that in the eleventh embodiment the inverse number section 16c of the observer gain in the inertia estimating section may be removed and then the construction of the inertia error estimating section 16 becomes the same as that in FIG. 2. Also, the speed-adjusting period detecting circuit as shown in FIG. 13A is used in the tenth and eleventh embodiments as is similar to that in the eighth and ninth embodiments since the load torque estimate $\hat{\tau}_L$ is not added to the output of the speed control amplifier 12 in the tenth and eleventh embodiments.

With the thus arranged embodiments, it becomes possible to estimate the inertia of the torsionally vibrating 2-mass system which generates a deviation of the load inertia during operation. Furthermore, even if the 2-mass torsional vibration is occurred in the system, if the vibration is converged, it is possible to estimate the inertia of the system.

What is claimed is:

1. A speed control system for controlling a two-mass system having a motor and a load connected through an elastic shaft, comprising:

a speed control amplifier for amplifying a difference between a preset speed and a motor speed;

a load torque estimate observer for obtaining a load torque estimate;

a model machine control system for outputting a load torque command upon receiving the sum of the output of the speed control amplifier and the load torque estimate, the speed control system controlling the two-mass system according to the load torque command;

means for outputting an observer speed estimate from a first integral factor which has a model machine time constant of the sum of a machine time constant of the motor and a machine time constant of the load in such a manner so as to input a difference between the load torque estimate and the load torque equivalent value into the first integral factor;

means for determining an inertia of the two-mass system by dividing the output from the first integral factor by the motor speed; and means for controlling the model machine control system and the speed control amplifier based on the inertia of the two-mass system.

2. A speed control system for controlling a two-mass system having a motor and a load connected through an elastic shaft, comprising:

a speed control amplifier for amplifying a difference between a preset speed and a motor speed;

a load torque estimate observer for obtaining a load torque estimate;

a model machine control system for outputting a load torque command upon receiving the sum of the output of the speed control amplifier and the load torque estimate, the speed control system controlling the two-mass system according to the load torque command;

means for outputting an observer speed estimate from a first integral factor which has a model machine time constant of the sum of a machine time constant of the motor and a machine time constant of the load in such a manner so as to input a difference between the load torque estimate and the load torque equivalent value into the first integral factor;

means for obtaining an output from a second integral factor which has a model machine time constant of the sum of the machine time constant of the motor and the machine time constant of the load by inputting the output of the speed control amplifier;

means for obtaining a motor speed from a difference between the output of the second integral factor and an output of an observer-gain inverse-number section;

means for determining an inertia of the two-mass system by dividing the observer speed estimate by the motor speed; and means for controlling the model machine control system and the speed control amplifier based on the inertia of the two-mass system.

3. A system as claimed in claim 1, wherein an observer-gain inverse-number section is disposed in a parallel relationship with respect to the first integral factor, and an output of the observer-gain inverse-number section is added to the output of the integral factor.

4. A system as claimed in claim 2, wherein an observer-gain inverse-number section is disposed in a parallel relationship with respect to the first integral factor, and an output of the observer-gain inverse-number section is added to the output of the first integral factor.

5. A system as claimed in claim 1, wherein the difference to be inputted into the first integral factor is obtained from a difference between the load torque equivalent value and the sum of the output of the speed control amplifier and the load torque estimate.

6. A system as claimed in claim 2, wherein the difference to be inputted into the first integral factor is obtained from a difference between the load torque equivalent value and the sum of the output of the speed control amplifier and the load torque estimate.

* * * * *